United States Patent
Fossum et al.

(10) Patent No.: US 6,611,288 B1
(45) Date of Patent: Aug. 26, 2003

(54) DEAD PIXEL CORRECTION BY ROW/COLUMN SUBSTITUTION

(75) Inventors: Eric R. Fossum, La Crescenta, CA (US); Nick Doudoumopoulos, Marina Del Rey, CA (US); Roger Panicacci, Los Angeles, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/031,145

(22) Filed: Feb. 26, 1998

(51) Int. Cl.[7] .................................................. H04N 9/64
(52) U.S. Cl. .................................................... 348/246
(58) Field of Search ................................. 348/241, 246, 348/247; 382/272, 254, 275, 149, 205, 274; 358/448, 447, 461

(56) References Cited

U.S. PATENT DOCUMENTS

| | | | | |
|---|---|---|---|---|
| 4,567,525 A | * | 1/1986 | Endo et al. | 348/246 |
| 4,805,023 A | * | 2/1989 | Younse et al. | 348/247 |
| 4,958,374 A | * | 9/1990 | Tokita et al. | 382/149 |
| 5,354,977 A | | 10/1994 | Roustaei | 235/472 |
| 5,544,256 A | * | 8/1996 | Brecher et al. | 382/149 |
| 5,982,946 A | * | 11/1999 | Murakami | 382/272 |
| 6,276,605 B1 | * | 8/2001 | Olmstead et al. | 235/462.41 |

OTHER PUBLICATIONS

Schanz et al. Smart CMOS Image Sensor Arrays; IEEE Transactions on Electron Devices, vol. 44, No. 10. Oct. 1997.*

* cited by examiner

Primary Examiner—Aung S. Moe
(74) Attorney, Agent, or Firm—Dickstein Shapiro Morin & Oshinsky LLP

(57) ABSTRACT

Bad pixels areas in an optical device are investigated and corrected. An upper limit on the number of bad areas is defined. Each bad area can be one, or more than one pixel.

14 Claims, 2 Drawing Sheets

DEAD PIXEL CORRECTION BY ROW/COLUMN SUBSTITUTION

FIELD OF THE INVENTION

The present invention describes an operation of compensating for defective pixels in an image sensing device.

BACKGROUND AND SUMMARY

Any manufactured device has certain defects. Minimization of defects yields a higher quality product. However, it is usually less expensive to make a device using less precise manufacturing techniques. Devices that are produced using less precise manufacturing techniques have a higher probability of defects.

Typical semiconductor processing techniques define some tradeoff between the quality and cost of manufacture. The semiconductors are tested for defects, and any semiconductor which has more than a certain percentage of defects is usually discarded.

Optical semiconductors, and especially image acquisition semiconductors, are especially sensitive to defects. A bad area in such a semiconductor will show up as a bad area on the image that is acquired by the semiconductor.

Optical devices operate on spatially distributed units of picture elements or pixels. A typical defect in such an optical semiconductor is a pixel error—"dead pixel". The dead pixels may not work at all, or alternatively may be brighter or dimmer than desired. Depending on the desired quality and the intended application, a single defective pixel may be sufficient to cause the device containg pixels to be discarded.

The inventors recognized the tradeoff between cost of manufacture and percentage of usable product. The present specification defines techniques for compensating for dead pixels in an optical device.

The optical devices are usually formed on a semiconductor substrate. The area of that substrate, or "real estate", is usually quite limited, especially in an image sensing array. Images are acquired by sensing and accumulating incoming optical energy. The available real estate on an image sensing chip is hence predominately consumed by the pixel array.

Active pixel sensors use some of the area of the substrate to house control circuitry. An active pxiel sensor is described in U.S. Pat. No. 5,471,515, the disclosure of which is herein incorporated by reference. These new techniques have opened the way for incorporating associated control circuitry on the chip. However, the inventors recognized that this other required circuitry limits the amount of real estate that can be allocated to the dead pixel correcting system.

A high quality image is often formed of many pixels. Storing a map of an entire 1024×1024 array would require 1024×1024=1 Mb of memory. The inventors recognized that this amount of memory could occupy an impractical percentage of the chip real estate.

According to one aspect, a tradeoff is determined between the amount of memory and hence real estate which will be dedicated to dead pixel correction, and the expected number of dead pixel areas. A practical upper bound on the number of dead pixel areas is defined. That defined number of dead pixel areas can be corrected.

Another aspect of the invention allows a single indication to be stored to represent either a dead pixel or some pre-defined group of dead pixels. A dead pixel area is hence identified as either a pixel or a group of pixels that includes pixel elements that are in some way defective.

BRIEF DESCRIPTION OF THE DRAWINGS

These and other aspects of the invention will now be described in detail with reference to the accompanying drawings, wherein.

DESCRIPTION OF THE PREFERRED EMBODIMENTS

Figure 1:
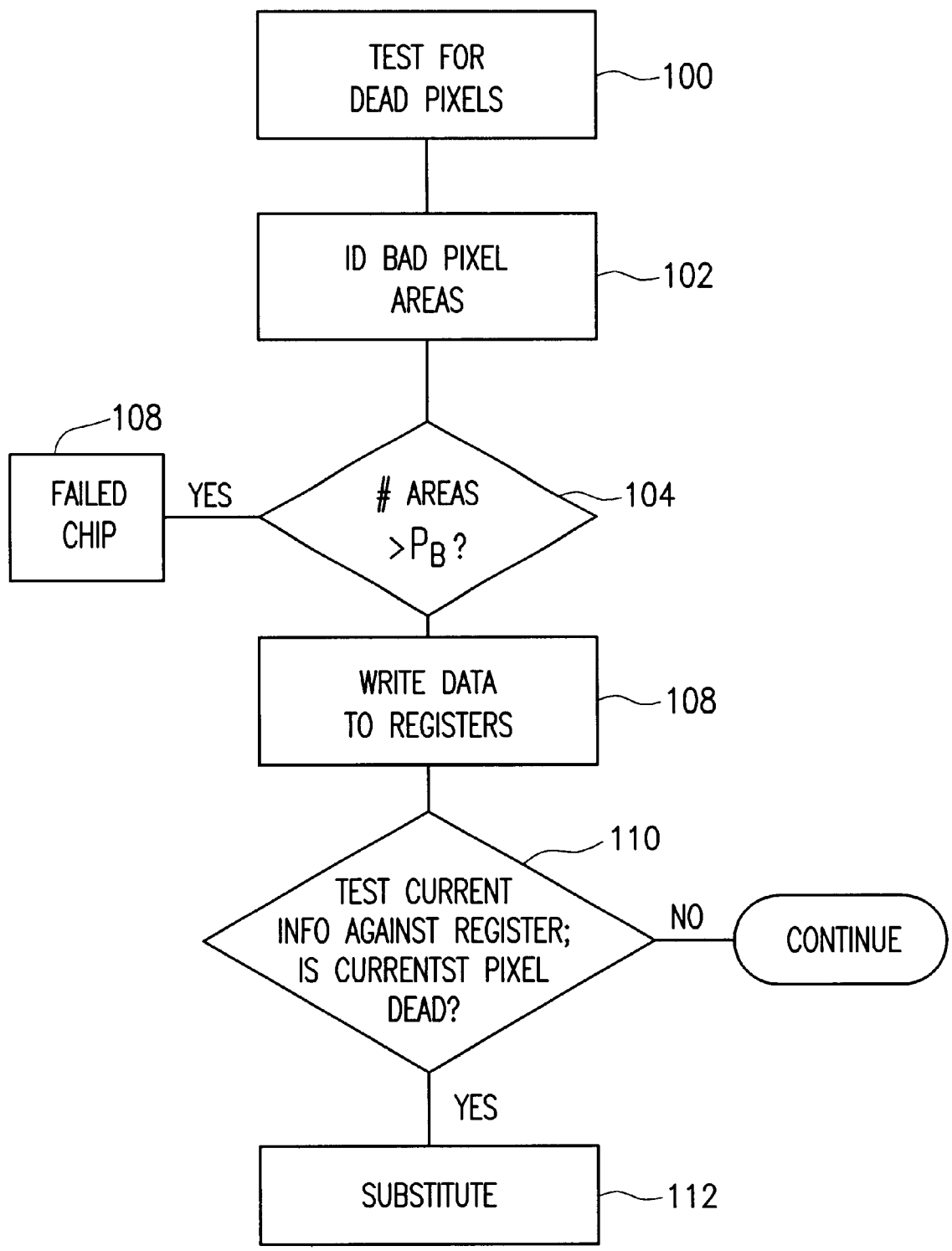
FIG. 1 shows a flowchart of operation of a preferred embodiment.

FIG. 1 shows an overall flowchart of the operation of the present invention. Correction of a dead pixel area is accomplished in two stages. First, the location of any dead pixel areas is identified. Next, a processing technique is used to compensate for that dead pixel during image processing.

The optical device is tested for dead pixels at step 100. Identification or tagging of dead pixels is preferably carried out at chip start up.

One such test can be carried out by activating each of the pixels for a short time in sequence, and monitoring the output for a predefined expected result. Pixels which respond with an optical output that is different than desired by a predetermined amount are identified as dead. The test system is driven by controller which stores a grid of data indicating those bad pixel areas.

Defective pixel processing circuits in entire columns must be identified by injecting a voltage into all the column lines through a dummy test row. That voltage on the column line is treated like a reset level. The voltage is stored in A/D converters 202 that are located at the bottom of the rows. Then, the dummy row is deselected in order to allow the column line to drain to zero volts. The resulting voltage is also stored and the difference between the two stored voltage level is A to D converted. If the column circuitry is working properly, the positive voltage differential will be greater than the range of the A/D converter and as a result each digital number should be a maximum value produced by the A/D converter.

Figure 3:
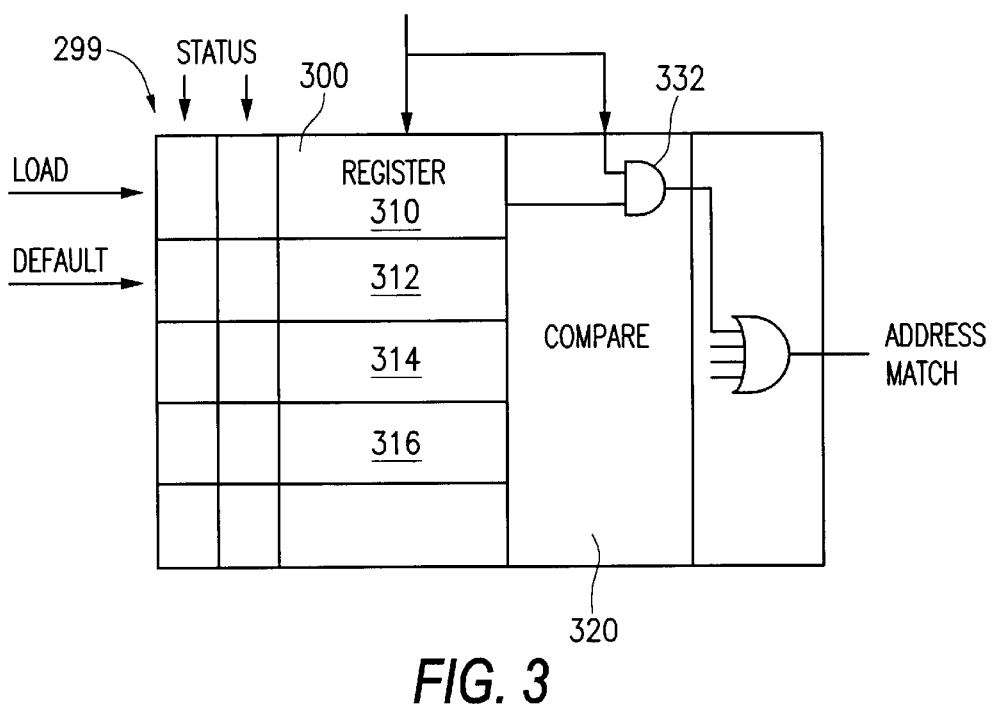
FIG. 3 shows an equivalent circuit of registers and comparison logic.

This technique can be used to determine bad columns which are hence stored in the dead pixel register 204 that is within the control unit 200. Details of the dead pixel register 204 are shown in FIG. 3.

The process is repeated by showing the injected voltage and zero volts into the A to D converter in the opposite order. In that case, the negative voltage differential should be less than the A to D range. Hence, the output should be all 0's. The information obtained in this way is used to program the dead pixel register to indicate the pixel areas which are actually dead.

An alternate test procedure targets screening and tagging during a wafer level test. This process uses an image sensor to acquire and store several frames in the dark. Next, several frames are acquired under illumination. The illumination needs to be uniform and low enough that it will not saturate the array. The pixel noise dark current and relative response can hence be detected.

All pixels which do not fall within the specified performance windows are identified and their addresses are stored in the registers 300.

Alternate test schemes can test electrical resistance or the like.

Figure 2:
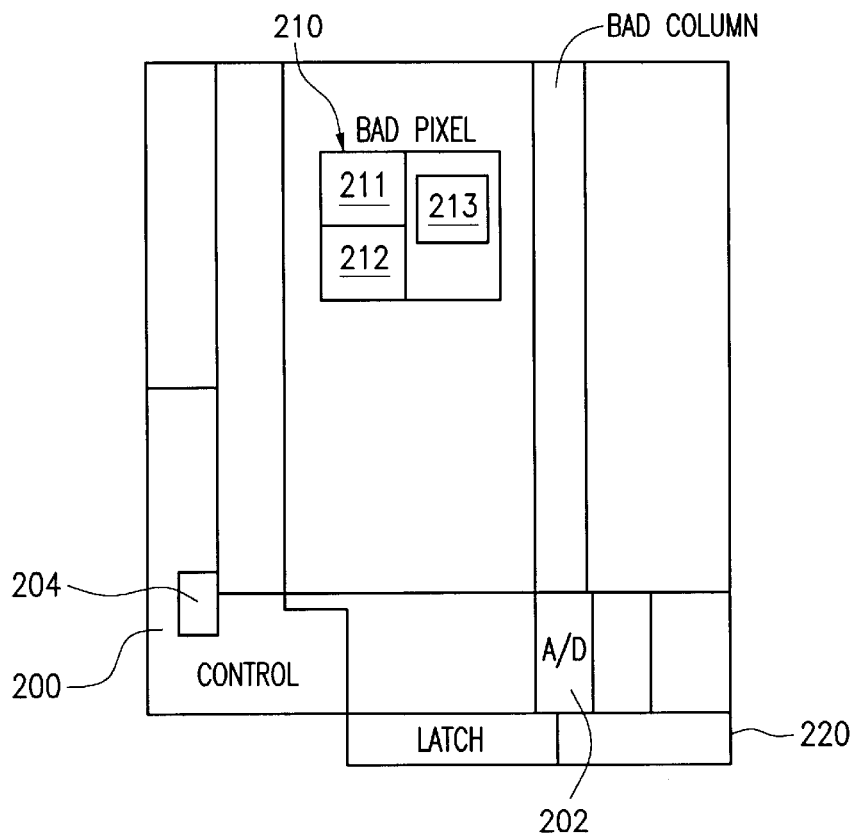
FIG. 2 shows an exemplary layout of an optical array on the substrate.

At step 102, the bad pixels which were found in step 100 are investigated to determine the dead pixel areas. Exemplary dead pixel areas are shown in FIG. 2—they include a single dead pixel 200 or a contiguous group of bad pixels that can be identified globally by a single stored information unit. By non-limitive example, an entire row of pixels 202 could be identified as bad by indicia indicating "ROW X". An entire column 204 of pixels can be identified as bad by "COLUMN Y", a neighborhood of pixels surrounding a central pixel can all be identified as bad as "5 pixels around x, y". A single pixel x, y can of course also be identified. Each of these pixel areas can be identified by a single indicia including an address. The preferred indicia is of the form (R, C, T) where R is the row number, C is the column number and T is the indication of the area type. T can be, for example, a three bit code which is a reserved sequence used for identifying the area types. As described above, T can indicate an entire row, entire column, 3×3 neighborhood surrounding the row and column value specified, and the 5×5 neighborhood surrounding that specified row and column. Other shapes of bad pixel areas could also be defined. This allows tailoring the shape of the bad pixel areas to approximate the geometrical arrangement of manufacturing defects.

Step 104 tests to determine if the number of bad pixel groups is greater than the predefined upper limit of bad pixel values $P_B$ representing the number of registers 300 in the unit 204. If so, there are more dead pixel groups than can be corrected by the limited number of registers that have been allocated for that purpose. The chip is hence identified as being fatally flawed and is discarded at 105. If not, the indicia of bad pixel groups are formatted and output at step 108.

The preferred embodiment is an active pixel sensor. This specific preferred embodiment includes on-chip timing and control circuitry shown generally as 200, which forms a basic part of the active pixel sensor. The present disclosure is not limited to use with such on-chip timing or active pixel sensors; however, some on-chip memory structure is preferable in order to store and process the indicia.

The preferred upper limit is four in this embodiment. This requires four memory locations, preferably on the chip.

The preferred register architecture is shown in detail in FIG. 3. Four register locations: 310, 312, 314, and 316 can store up to four indicia. The registers operate according to either the default prestored routine, user-alterable routine.

Each register is associated with comparison logic 320 which operates according to a hard-wired sequence to control each of the pixels to provide their information during processing. Step 110 indicates this operation of determining if the current pixel is dead.

The embodiment which is now described operates in units of rows and columns: so that a whole row, or a whole column, or a single pixel is identified as dead.

In this embodiment, the "T" bit $T_0$ in each register indicates a specific bad row. A row address associated with an active (here "1") $T_0$ bit is compared with the current row $R_c$ by multiple AND gates shown as 332 within comparison logic 320. An active "1" output indicates that the rows are the same. If $T_0$ is also high, and gate 324 outputs a 1. This "1" is passed by OR gate 336 as an address match flag. In a similar way, bad columns and/or single pixels can be flagged by gates and indicated by the status bits 299. Each of the flagged addresses are flagged and are replaced by other information as described herein.

This embodiment facilitates substitution using the nearest neighbor technique. The address match flag generates a command to replace the flagged dead pixel with the previous good pixel as shown at step 112. In its simplest form this uses a single pixel delay line, e.g. a latch 220, before the digital output drivers. The address match flag enables switching in the stored value in the latch that indicates the previous good pixel valve to clock out through the digital output drivers.

Although only a few embodiments have been described in detail above, those having ordinary skill in the art will certainly understand that many modifications are possible in the preferred embodiment without departing from the teachings thereof.

All such modifications are intended to be encompassed within the following claims.

For example, different shaped neighborhoods can be defined, and the control logic would then use counters or the like to compare the neighborhoods. The "T" values, of course, can be used in combination to enable $2^n$ different combinations, where n is the number of T bits.

The pixel substitution can be more complicated than the above. For example the substituted pixel could be a median of some defined group.

This system describes the operations taking place in hardware, defined, for example, using HDL. Of course, other hardware configurations, e.g., a FPGA, could alternately be used, or the operation could be software controlled.

What is claimed is:

1. An apparatus for detecting an image in pixel format, comprising:
    a photosensitive substrate, having an image detection portion operating in pixel units, said substrate including:
        a plurality of photodetecting pixels;
        a plurality of on chip registers, each register having a pixel address storage area, each said storage area being capable of storing a value indicative of a block of defective pixels, wherein said value comprises a type indicator indicative of a shape of said block of pixels;
        a comparing part, comparing current addresses for said pixels with value that are stored in said registers, and producing an output indicative thereof; and
        a pixel correction element detecting addresses of bad pixels from said comparing part and which substitutes a different pixel value corresponding to an obtained pixel value based on said output from said comparing part.

2. Apparatus as in claim 1, where said apparatus is an active pixel sensor.

3. Apparatus as in claim 1, wherein said type value is indicative of a non-linear shape including a plurality of adjacent pixels.

4. Apparatus as in claim 3, wherein said non-linear shape comprises an N×N block of pixels.

5. A pixel correction method, comprising:
    initially determining pixels within a pixel array which are not operating according to a predetermined criteria;
    defining an indicia of said pixels, wherein said indicia includes an address and a single value which represents a shape of a block of pixels and storing said indicia in a storage element on the same substrate as said pixel array;
    determining an address of a current pixel;
    comparing, on the same substrate as said pixel array, said address to said indicia in said storage element; and when a pixel is detected as not operating according to the criteria based on said comparing, replacing the not operating pixel and other pixels in said block of pixels corresponding to the single value with a value of an obtained good pixel.

6. A method as in claim 5, wherein said indicia represents a specified group of pixels, from the group consisting of a single pixel, a row of pixels, or a column of pixels.

7. A method as in claim 5, wherein said taking comprises substituting at least one different pixel for said pixels which are not operating according to the criteria.

8. A method as in claim 5 wherein said obtained pixel is a previously-obtained good pixel.

9. Method as in claim 8 wherein said obtained pixel is the last obtained good pixel.

10. Apparatus as in claim 1, wherein said indicia comprises a row address, a column address, and a type.

11. Apparatus as in claim 10, wherein the type is selected from one of a row, a column, and a shape of pixels.

12. An apparatus for detecting an image in pixel format, comprising:
 a photosensitive substrate, having an image detection portion operating in pixel units, said substrate including:
  a plurality of photodetecting pixels
  a plurality of on chip registers, each register having an address storage area, each said storage area being capable of storing a value indicative of a block of defective pixels, wherein said value comprises a type indicator indicative of a shape of said block of pixels;
 a comparing part, comparing current addresses for said pixels with value that are stored in said registers, and producing an output indicative thereof;
 an analog to digital converter operative to convert a sampled analog signal from a photodetecting pixel to a digital pixel value;
 a digital output; and
 a pixel correction element detecting an address of a bad pixel from said comparing part and which replaces a digital pixel value corresponding to a pixel value obtained from said bad pixel with a different digital pixel value corresponding to another obtained pixel value before said pixel value is presented at said digital output, based on said output from said comparing part,
wherein said apparatus is an active pixel sensor including, in each of said pixel units, a photosensor, an in-pixel follower element and in-pixel selection element.

13. Apparatus as in claim 12 wherein said pixel correction element substitutes a last good obtained pixel value for any determined bad value.

14. Apparatus as in claim 12 wherein said address represents a plurality of different pixel values.

* * * * *